(12) United States Patent
Espinoza

(10) Patent No.: US 8,202,917 B2
(45) Date of Patent: Jun. 19, 2012

(54) PILLOW PANEL REACTOR AND PROCESS

(75) Inventor: Rafael Espinoza, Tulsa, OK (US)

(73) Assignee: Emerging Fuels Technology, Inc., Tulsa, OK (US)

( * ) Notice: Subject to any disclaimer, the term of this patent is extended or adjusted under 35 U.S.C. 154(b) by 273 days.

(21) Appl. No.: 12/462,083

(22) Filed: Jul. 29, 2009

(65) Prior Publication Data

US 2010/0093877 A1   Apr. 15, 2010

Related U.S. Application Data

(60) Provisional application No. 61/084,448, filed on Jul. 29, 2008.

(51) Int. Cl.
| | |
|---|---|
| C07C 27/06 | (2006.01) |
| C07C 1/00 | (2006.01) |
| C07C 31/02 | (2006.01) |
| C07C 27/00 | (2006.01) |
| B01J 19/00 | (2006.01) |

(52) U.S. Cl. ........ 518/728; 585/639; 568/840; 422/148; 422/198; 422/211

(58) Field of Classification Search ........................ None
See application file for complete search history.

(56) References Cited

U.S. PATENT DOCUMENTS

| | | |
|---|---|---|
| 4,700,445 A | 10/1987 | Raskin |
| 5,833,932 A | 11/1998 | Schmelz |
| 6,612,092 B1 | 9/2003 | Mabru et al. |
| 2003/0219903 A1 | 11/2003 | Wang et al. |
| 2004/0076562 A1 | 4/2004 | Manzanec et al. |
| 2006/0041029 A1 | 2/2006 | Bowe et al. |

FOREIGN PATENT DOCUMENTS

WO     2007008495     1/2007

*Primary Examiner* — Yate K Cutliff
(74) *Attorney, Agent, or Firm* — Head Johnson & Kachigian P.C.

(57) ABSTRACT

A novel catalytic reactor suitable for use in chemical and petrochemical processes. The reactor is of a pillow panel that has superior heat transfer properties. This invention also relates to a chemical process, such as a Fischer-Tropsch synthesis process performed with use of the novel pillow panel reactor.

15 Claims, 5 Drawing Sheets

(a)

(b)

(a)

(b)

(a)

(b)

PILLOW PANEL REACTOR AND PROCESS

CROSS-REFERENCE TO RELATED APPLICATIONS

This application is based on Provisional Application U.S. Ser. No. 61/084,448 filed Jul. 29, 2008.

FIELD OF THE INVENTION

This invention relates to a novel catalytic reactor suitable for use in chemical and petrochemical processes. The reactor is of a pillow panel reactor that has superior heat transfer properties. This invention also relates to chemical processes, such as a Fischer-Tropsch synthesis process, conducted with use of this novel pillow panel reactor.

BACKGROUND OF THE INVENTION

Various endothermic and exothermic chemical reactions require effective heat transfer to maintain the reaction, especially in a commercial process unit, such as in a chemical plant or petroleum refinery where great amounts of heat need to be transferred. One such commercial chemical process that requires effective heat transfer is the Fischer-Tropsch synthesis process. Synthesis gas, a preferred feedstream to the reactor of this invention, is primarily comprised of carbon monoxide and hydrogen which can be produced from a range of carbonaceous feedstocks such as natural gas, coal, petroleum coke, heavy oils, biomass, landfill gas, biogas and municipal waste. Synthesis gas can be converted to a wide range of hydrocarbons such as methanol, mixed alcohols, olefins, paraffinic hydrocarbons and mixtures thereof. These reactions are generally referred to as Fischer-Tropsch and related synthesis. These materials are useful for production of a wide range of chemical and fuel products.

The Fischer-Tropsch synthesis reaction is a good reaction to demonstrate the present invention. This reaction is highly exothermic and therefore the synthesis reactor must be designed to conduct the reaction and effectively remove the heat of reaction as it is generated to control the reaction temperature. Additionally, the Fischer-Tropsch reaction is diffusion limited when the catalyst particle size is greater than about 300 microns. The use of larger particles leads to diminished productivity and higher methane selectivity, thereby requiring higher catalyst volumes and diminished production of the higher valued C8+ hydrocarbons. Tubular reactors generally must utilize catalyst particle sizes greater than 0.75 mm in order to limit pressure drop. Using a pillow panel design allows use of catalyst particle sizes in the range of about 200-600 microns.

Various types of reactors have been employed for Fischer-Tropsch and related synthesis reactions. Many of these reactors are modified heat exchangers or incorporate heat exchanger elements in the reactor designs. The reactor capacity may be limited due to heat and/or mass transfer problems. The first Fischer-Tropsch reactors used in Germany in 1936 were the lamella plate design, wherein a reactor shell was a rectangular tank made of iron plate that, on account of the normal pressure operation, was of very simple design. However, the internal section of the reactor was of a much more complex design. The reaction chamber was occupied by a lamella bundle consisting of 2 mm thick vertical iron plates spaced 7 mm apart to transfer the heat of reaction to numerous horizontal cooling tubes in which pressurized water was circulating. The catalyst, a fine granulate or extrudate, was located in the gaps between the vertical lamellas.

Lamella reactors had several drawbacks, for example they were mechanically complex and had poor heat transfer. Although the catalyst was well distributed and close to a heat transfer surface or plates, however, the plates were just extended surfaces from the panels and the heat transfer was not very effective. The poor heat removal limited the reactor capacity and led to local hot spots which caused catalyst damage.

After the lamella plate reactor, a special type of multitubular reactor was developed wherein the catalyst was placed in the space between two concentric tubes. Heat removal was accomplished via pressurized water that surrounded the outer tube and also had access to the inner tube via a short connecting pipe. Therefore, heat transfer was improved compared to that of the lamella reactor, but the capacity was still relatively low and the reactor was mechanically complex.

After World War II the South African company Sasol employed an improved tubular reactor known as the ARGE high capacity reactor. ARGE reactors were designed like a vertical shell and tube heat exchanger with boiling water in the shell and catalyst packed in the tubes. These reactors were a significant improvement over the lamella plate reactors, or the twin tube reactors, in terms of heat transfer and productivity. However, the tubes were long which limits catalyst particle size due to pressure drop and the large number of tubes requires a long time to load and unload the catalyst.

U.S. Pat. No. 7,084,180 describes a micro channel reactor for Fischer-Tropsch synthesis. The micro channel reactor operates at very high productivities on the order of 10-20 times more than the productivity of ARGE reactors. Such reactors, in spite of their very high performance, are difficult to construct and do not scale up well to large single train capacity.

In addition to the range of fixed bed reactors that have been employed for Fischer-Tropsch and related synthesis, there have been moving bed reactors such as fluidized bed reactors and slurry bubble column reactors. Such reactors have difficulty with catalyst attrition, catalyst filtration and scale up. The slurry reactor utilizes smaller catalyst particles which eliminate the product debits associated with larger particles. However the slurry reactor is both costly and difficult to scale Although most of the above mentioned Fischer-Tropsch reactors have met with some degree of success there is need in the art for a synthesis reactor that is readily scalable, that provides excellent heat transfer characteristics at high productivities while utilizing optimized catalyst materials and that can be constructed easily in moderate to large single train capacity. The pillow panel design of the present invention offers the advantages in using smaller catalyst particles in a reactor configuration which scales directly from the small pilot scale (<1 bbl/day) to the larger sizes (>1000 bbl/day).

SUMMARY OF THE INVENTION

This invention relates to a novel chemical reactor having both superior heat transfer properties and easy constructability. The reactor is of a pillow panel design that is comprised of a plurality of pillow panels wherein a desired catalyst is preferably placed between the panels (reaction zone) with a heat transfer fluid, such as steam, conducted through the panels to remove or to deliver heat to the reaction zone. It is also within the scope of this invention that the catalyst be located within the pillow panels and a heat transfer medium passed through the space between panels.

The present invention also relates to catalytic processes using a pillow panel reactor of the present invention wherein a catalyst suitable for the intended reaction is used. Non-limiting examples of catalytic processes that can take advantage of the present invention are preferably those that are endothermic as well as exothermic and that require the transfer of a significant amount of heat. One such reaction is the conversion of a gas comprising CO and $H_2$ with or without inert components, such as $N_2$, $CO_2$ or methane into hydrocarbons. The present invention also relates to conducting a syngas conversion process in a reactor comprising a bundle of pillow panels for removal of reaction heat. The space between the panels is filled with catalyst particles.

Pillow panels are preferably configured into a bundle comprised of a plurality of parallel panels substantially equally spaced. The panels may each have one or more ports for flowing a heat transfer fluid into and out of the pillow panel interior. The ports are preferably manifolded together so that the fluid may be easily distributed. For example, boiler feed water may be added at an inlet manifold and removed at an exit manifold as water and steam. The steam can be passed to a steam drum where the pressure can be controlled to maintain a uniform temperature in the pillow panels to remove at least a portion of the heat of reaction.

As it relates to the present invention the pillow panels are substantially uniformly separated to provide a void space that can be at least partially filled with catalyst particles. The pillow panel bundle and manifolds can be configured to slide into a vessel shell, preferably of a cylindrical shape, that has one or more inlet ports for introducing feedstock gases and one or more outlet ports for removing product and residue gases. The vessel may also have additional ports for the introduction and removal of heat transfer fluids and means to connect these ports to the pillow panel manifolds.

In one preferred embodiment, the pillow panel bundle is configured in a horizontal vessel with the panels normal to or perpendicular to the longitudinal axis of the horizontal vessel. The preferred configuration is to run the panels normal to the longitudinal axis. The panels are preferably oriented vertically so that the plurality of catalyst zones defined by the space between the panels are substantially vertical. Feed gases can be introduced at the top of the horizontal vessel and conducted downward through the plurality of catalyst zones to exit at the bottom of the vessel.

A separator section may also be optionally installed on the bottom of the reactor vessel to collect components, such as waxy components, that may condense at reactor conditions. Unreacted vapors can be removed and conducted to a second stage reactor or they can be completely or partially recycled to the reactor vessel with fresh feed. Recycle ratio, if any, can be significantly adjusted depending on the composition of the fresh feed.

In another preferred embodiment, two pillow panel bundles are installed in the same horizontal reactor. The two bundles can be operated as two stages in series or as two parallel sections of a single stage, with or without recycle.

In yet another preferred embodiment, one or more pillow panel bundles can be installed in a vertically oriented reactor vessel. In such an orientation, the pillow panel bundles can be configured with a catalyst support grid or screen. Optionally, manifolds of tubing can be installed to introduce or to remove gases and/or liquids to different sections of the reactor, such as hydrogen, olefins, hydrocarbons or water to enhance reactor performance. The addition or removal of gases and/or liquids may be at any suitable location including above, below or in one or more of the catalyst zones.

BRIEF DESCRIPTION OF THE DRAWINGS

FIG. 1(*b*) is a side view of the pillow panel cut out section

FIG. 2(*b*) illustrates a cross section of the reactor and shows the pillow panel bundle assembly that consists of equally spaced pillow panels. The void space between the pillow panels is filled with catalyst.

DETAILED DESCRIPTION OF THE INVENTION

Figure 1:
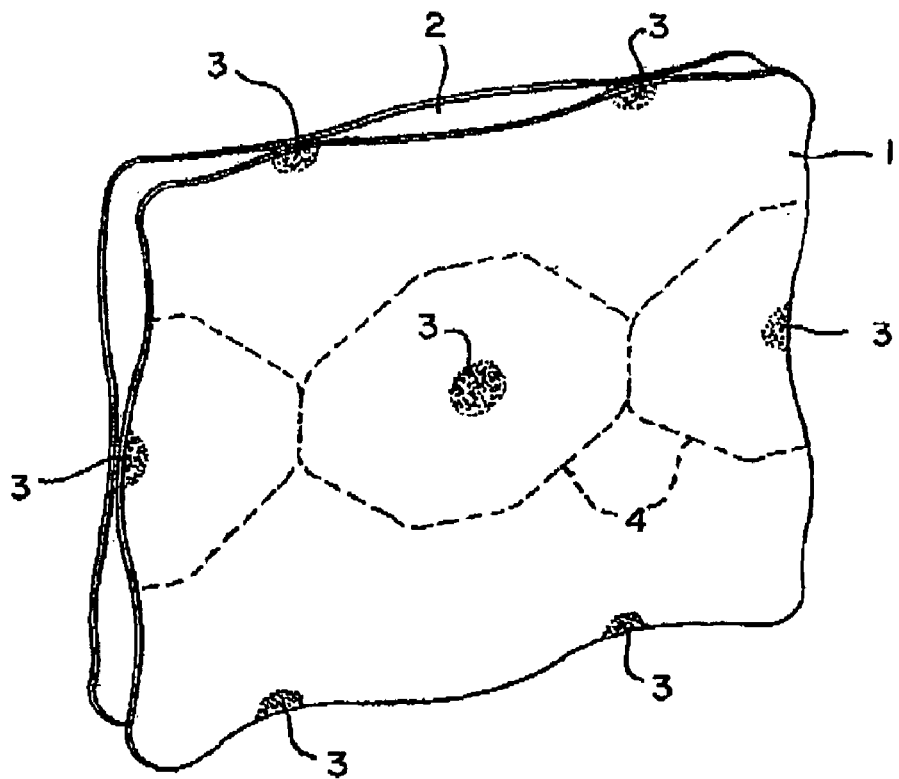
FIG. 1(*a*) is an illustration of a small section of a pillow panel.
Figure 1:
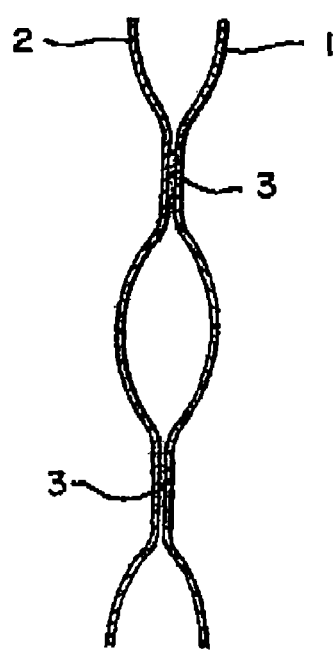

The term "pillow panel" refers to a heat transfer element made by attaching two sheets of metal at a number of locations. The attachments may be any type of mechanical attachment free of leaks. The preferred method is to spot weld the sheets. The attachment spots are configured in a repeating pattern and represent a small percentage of the total area of the sheets. The attachment points can also be placed to form a predetermined pattern of passageways. The sheets are then sealed around the perimeter. A hydraulic fluid or gas is pumped between the sheets to expand the non-attached section out into a pillow-like configuration. The resulting pillow panel can be configured with ports to allow for adding and removing fluid inside the panel, that is in the expanded sealed space between the two sheets. For example, it is preferred that at least one inlet port be positioned at one end of a panel and at least one outlet port at the opposite end. The attachment points may be offset for alternating panels so that bulges on one panel are adjacent to indentations (attachment points) on the adjacent panel, thus minimizing the spacing variation between panels. The material of the pillow panels can be any material normally used to build heat exchangers, such as carbon steel, stainless steel, aluminum, and any suitable metal alloy. Preferred is stainless steel. It will be understood that the term "panel" is not to be confused with the word "sheet". In other words, a panel is comprised of two metal sheets jointed together as discussed above.

The pillow panel reactor may be used advantageously where a reaction is moderately to highly exothermic or endothermic and relatively large amounts of heat must be added or removed to maintain the reaction temperature. For example, an exothermic reaction with a heat of reaction of at least −50 KJ/Mol may be carried out in a pillow panel reactor of the present invention. Likewise, an endothermic reaction with a heat of reaction of at least 50 KJ/Mol may also be advantageously carried out in a pillow panel reactor of this invention.

The pillow panel reactor of the present invention can be configured such that the catalyst is in the space between the panels or contained in the interior of the panels. Reactant gases pass over the catalyst to produce a reaction product. A heat transfer fluid is passed through the space not occupied by the catalyst. The preferred method is to pass the heat transfer fluid thru the panels while maintaining catalyst in the space between the panels. The heat generated by or consumed by the reaction is transferred through the pillow panel wall to the heat transfer fluid thereby maintaining a substantially constant temperature in the catalyst zone. Non-limiting examples of exothermic reactions that may be carried out in the pillow panel reactor include Fischer-Tropsch (−165 KJ/Mol), Methanol Production (−97.9 KJ/Mol), Ammonia Production (−92.4 KJ/Mol). Non-limiting examples of endothermic reactions that may be carried out in a pillow panel reactor are Steam Methane Reforming (165 KJ/Mol) and Dehydrogenation (122 KJ/Mol).

The term "pillow panel bundle" refers to two or more pillow panels joined by at least one manifold to function as a unit. Catalyst will fill at least a portion, preferably substantially all of the voids between panels or within the panel. The heat of reaction is transferred to a heat transfer fluid that flows inside the pillow panels or between panels, depending on where the catalyst is located.

The term "conversion" refers to the extent of which reacting gases, liquids or mixtures thereof are converted to products. In the case of Fischer-Tropsch conversions, conversion may be determined by subtracting the moles of CO in the outlet from the moles of CO in the feed and dividing the sum by the moles of CO in the feed.

The term "selectivity", for Fischer-Tropsch reactions, refers to the portion of CO converted that is converted to a specific product, such as methane or $C_1$.

The term "productivity", of Fischer-Tropsch reactions is a relative measure of catalyst activity defined as volume of CO converted per volume of catalyst per hour.

The term "synthesis gas" or "syngas" for purposes of this invention means a gas containing carbon monoxide and hydrogen.

The term "supported catalyst" as used herein refers to a catalyst that is made by adding catalytically active components to a support material. The support material generally has porosity and surface area and is typically comprised of compounds such as carbon, zeolites, or inorganic oxides like alumina, silica, silica/alumina, titania, or mixtures thereof. The catalytically active components, which are typically metal active for specific reactions, are dispersed on or within the support surface.

The term "promoter" as used herein refers to materials added to a catalyst in minor proportion to the catalytically active component. A promoter generally enhances the performance of the catalyst.

The term "gas hourly space velocity"—GHSV means volumes of feed gas passed thru the reactor per volume of catalyst per hour.

The performance of a chemical reactor system is a function of the thermal and mechanical properties of the reactor and the performance characteristics of the catalyst. The catalyst and reactor have to be matched well to optimize performance.

The activity of a supported catalyst is strongly influenced by metals loading and dispersion within practical limits. For Fischer-Tropsch 10-50% metal loading and 2-15% dispersion represent practical limits. Additionally, promoter metals, such as precious metals, may be used to activate the catalyst and enhance activity and stability of the catalyst.

Another factor that influences catalyst performance is particle size. It is known in the art that mass transfer limitations strongly influence Fischer-Tropsch catalyst performance. At very small particle sizes, below about 100 μm, pore diffusion is so low that products exit the pores before secondary reactions, such as hydrogen saturation and olefin reincorporation, take place to a significant extent. The result is a more olefinic lighter product. As particle size increases, secondary reactions are optimized resulting in a reduction of light products and higher C5+ products yields. This generally occurs with particles in the range of about 100 to 1000 μm size range preferably about 200 to about 500 μm. As particle size is increased above about 500 μm, C5+ product yields go down and methane selectivity goes up. The increase in methane selectivity can be dramatic, for example increasing from 6-8% for a particle size of about 200 to about 500 μm to around 20% or more for a 1 mm or larger particle at constant temperature. The selectivity debit is a function of particle size. Most fixed bed reactors require a particle size that is large enough to operate with acceptable pressure drop across the reactor. This requirement generally results in particles greater than about 1 mm in diameter. One solution has been to design the catalyst with a non-homogeneous metal loading so that the catalyst particle is large enough to perform with an acceptable pressure drop while the active metal is on the outer edge of the support within a range of about 100 to about 300 μm where the diffusion parameters can be optimized. In this configuration, a significant portion of the catalyst is void of active metal and therefore contributes no activity resulting in a larger reactor volume. The same is true of high voidage supports such as foams or monoliths, which are generally more difficult to manufacture.

It is desirable to optimize the reactor geometry so that a supported cobalt Fischer-Tropsch catalyst can operate in the optimal size range of about 100 to about 1000 μm preferable about 200 to about 500 μm while allowing the necessary volumetric flow of syngas to pass through the reactor with a low to moderate pressure loss. The pillow panel reactor of the present invention has these properties.

Another important reactor design consideration is the ability of the reactor to remove the heat generated by the reaction. If heat removal is not effective, hot spots may develop thereby resulting in poor catalyst performance or even in runaway conditions that can result in severe catalyst damage. The effective heat removal capacity of a tubular fixed bed reactor is largely dependent on the tube size diameter. As the tube size goes down the ability to remove heat goes up due to the fact that the hottest point in the tube—the center, is closer to a cooling surface and the surface to volume ratio is increasing. This design feature of a tubular reactor may be used beneficially as long as a more active catalyst can be made. However, this feature has its limits as the reactor with very small tubes gets to be mechanically complicated to build and operate.

It is desirable to be able to optimize reactor geometry so that catalyst particles are close to heat transfer surfaces without increasing the mechanical complexity of the reactor or the pressure drop of the system. The pillow panel reactor can be useful to optimize these catalyst and reactor properties.

Referring to the figures, FIG. 1 (a) illustrates a plan view of a small cut-out section of a pillow panel of the present invention and FIG. 1(b) a side view. FIG. 1(a) shows two metal plates 1 and 2 attached at multiple points. The attachment, or connecting, points can be made by any suitable technique for permanently joining two pieces of sheet metal. Spot welding is preferred. Lines 4 are indicative of the areas of greatest expansion, also referred to herein as bulge or pillow, between the plates. The bulge or pillow height is from about 0.05 to about 1 inch. Plates 1 and 2 are expanded except at the attachments points. The sections shown in FIGS. 1(a) and 1(b) show the plates open around the perimeter. The operational pillow panel will be sealed at the edges so that the panels may function at elevated pressure.

Figure 2:
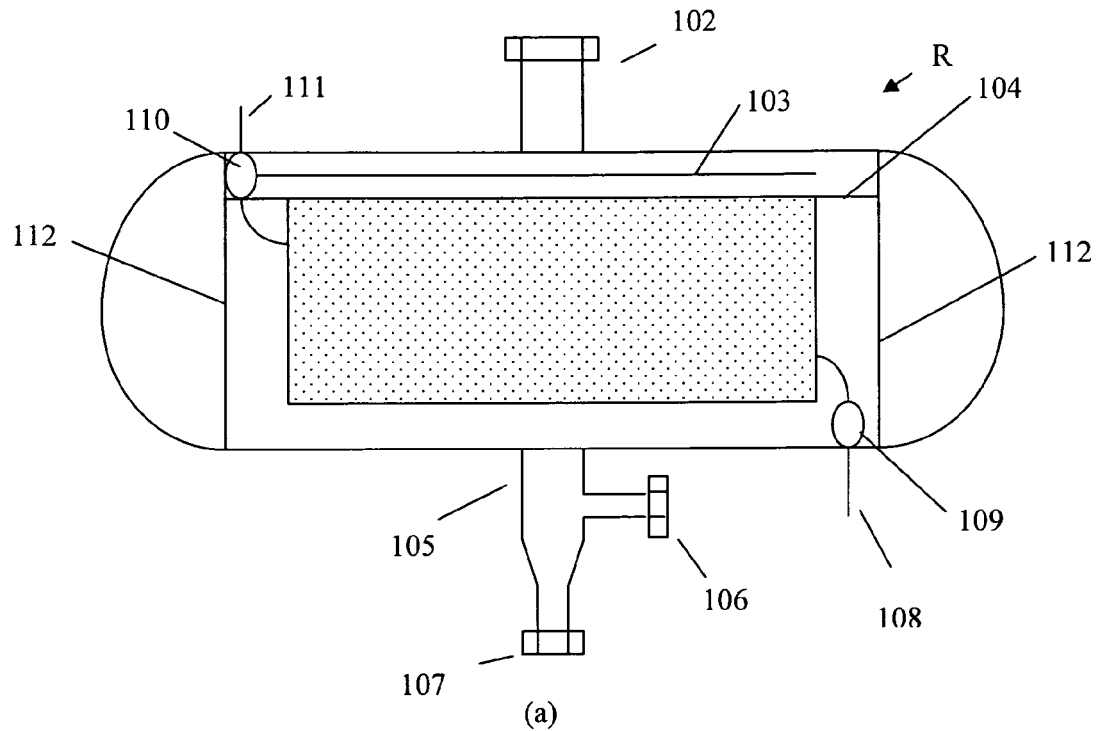
FIG. 2(*a*) is a side view of a single pillow panel assembly in a horizontal vessel.
Figure 2:
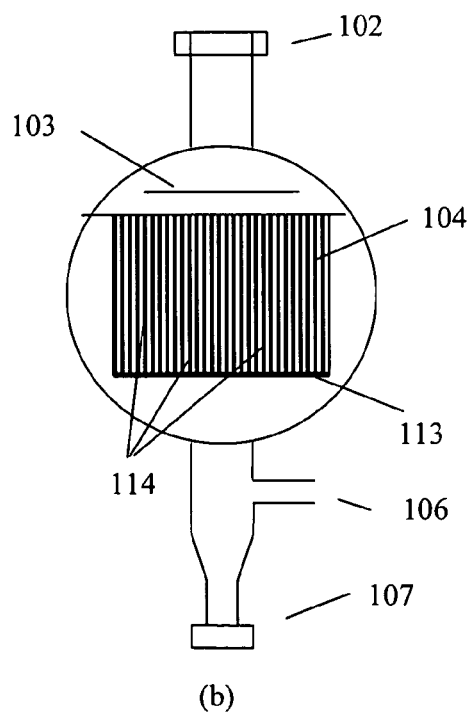

FIG. 2 hereof illustrates a horizontal vessel that contains a pillow panel bundle. FIG. 2(a) shows a cut-away side view of a horizontal reactor R with inlet port 102, gas distributor 103 and a pillow panel bundle 104. Gas distributors are well known in the art for distributing a gas into a reactor to avoid backflow and problems associated with gas maldistribution. This is typically done by designing orifices to create sufficient pressure drop. The reactor vessel R has a reservoir, or separator section 105, which can also be referred to as an exit line or port, for liquid product collection and the separation of gases. Unreacted gases and product vapors exit at outlet port 106 and heavy hydrocarbon product which is liquid at reactor temperature, exits at outlet port 107. The geometry of the exit port and gas-liquid separation system can also utilize a conventional knock out volume where the exit stream consisting of liquid and gas flow normal to the knock out volume.

A heat transfer fluid enters at inlet port 108 and flows to manifold 109 where it is distributed at predetermined locations to the pillow panel bundle. There may be more than one inlet and outlet ports associated with each pillow panel bundle. The heat transfer fluid will exit the bundle via manifold 110 and through outlet port 111. The pillow panel bundle may also be configured with end plates 112. In a preferred mode catalyst is contained in the space between panels and a heat transfer fluid flows through the interior of the panels. In another preferred mode, catalyst is contained within the interior of the panels and heat transfer fluid flows between panels. Mechanical spacers (not shown) may be added between the panels to maintain a substantially constant separation between panels. FIG. 2(b) depicts a cut-away side view of pillow panel reactor R. Inlet port 102 feeds reactant gasses to the top of the reactor. Gasses can be distributed more evenly by gas distribution plate 103. Reactant gases pass thru the spaces between the pillow panel bundle 104. The spaces 114 can be filled with a catalyst for conversion of the reaction or feed gas to desired products. A catalyst support grid 113 supports the catalyst while allowing the passage of unreacted gases, product gases and liquid hydrocarbon products. Catalyst support grids are well known in the art and are typically wedge wire screens or other suitable metal screens and filters designed to a particular fixed bed catalyst. Products that condense at reactor temperature are drawn off at outlet 107 while vapor phase products and inerts exit at outlet 106.

Figure 3:
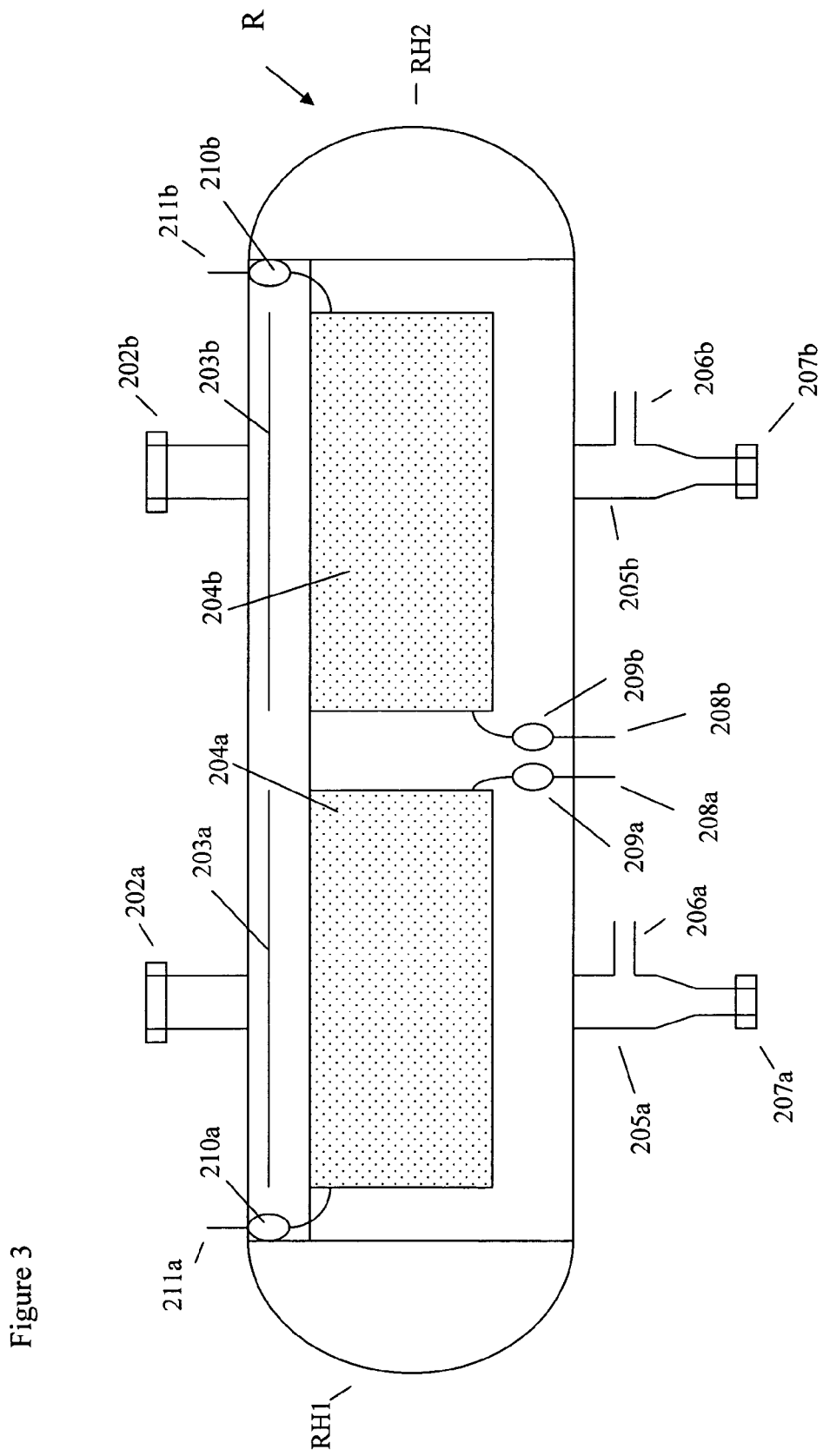
FIG. 3 is an illustration of a horizontal reactor that has two pillow panel bundles.

The pillow panel bundle with catalyst can be removed from the process train and catalyst can optionally be regenerated ex-situ. A second bundle can be quickly installed to the process with pre-activated catalyst resulting in increased runtime. Additionally, this switch-out of the catalyst volume eliminates the additional complexity and cost of incorporating the regeneration gases and heat sources to the process train. Another preferred embodiment is shown in FIG. 3 hereof. The horizontal reactor is essentially the same as shown in FIG. 2 hereof except that there are two separate pillow panel bundles. This configuration makes it possible to double the capacity of the reactor for a given pillow panel bundle size which will have mechanical limitations.

In FIG. 3 hereof, reactor R has two inlet ports 202a and 202b. There are two separate gas distributors 203a and 203b and two pillow panel bundles 204a and 204b. The reactor shell may optionally be configured with removable heads, RH1 and RH2, making it possible to remove and replace the pillow panel bundles. Two separators 205a and 205b, which can also be defined as exit nozzles for combined gas/liquid effluent, are attached to the bottom of the reactor to collect product that condenses at reactor temperature. Unreacted gases, product gases and inert gases exit outlet ports 206a and 206b. The heavy hydrocarbon product exits at outlet ports 207a and 207b. The exit geometry depicted with components 205a, 206a, 207a as well as 205b, 206b and 207b can incorporate a conventional liquid knock out design utilizing the entry of the effluent gas/liquid mixture normal to a knock out vessel in order to better facilitate gas/liquid separation.

Each pillow panel bundle has a separate inlet port 208a and 208b for feeding heat transfer fluid, such as boiler feed water, to manifolds 209a and 209b. Alternatively the manifolds could be fed from a single source (not shown). The heat transfer fluid exits at manifold 210a and 210b going to outlet ports 211a and 211b respectively. Outlet ports 211a and 211b are preferably joined to a common steam drum.

Figure 4:
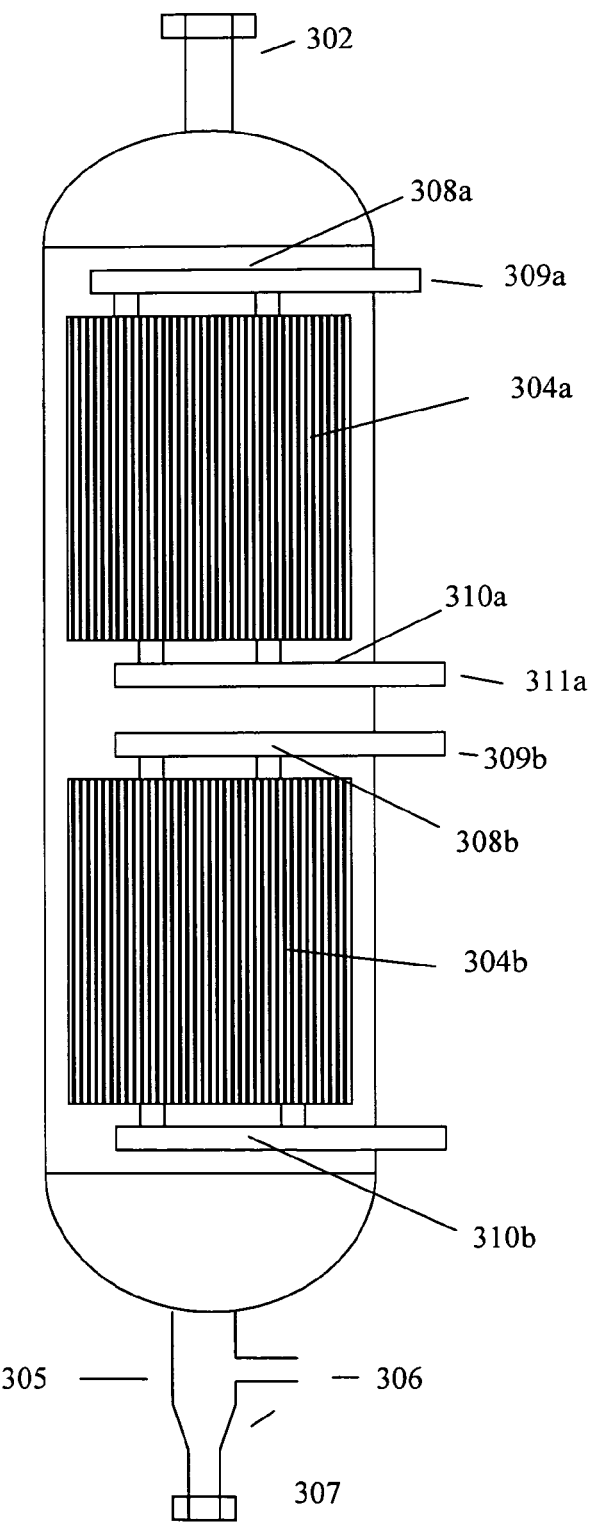
FIG. 4 is an illustration of a vertical reactor with two pillow panel bundles in series.
Figure 4:
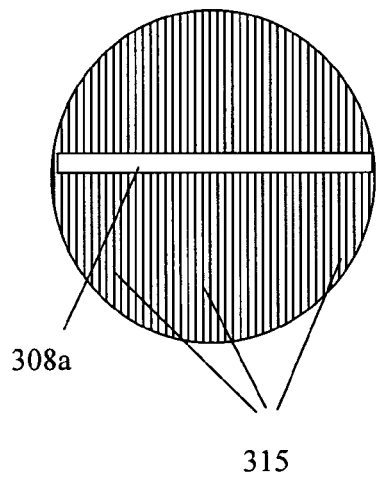

FIG. 4(a) hereof illustrates a vertical (in both vertical and horizontal configurations the gas feed is down flows) version of the pillow panel bundle with two separate bundles 304a and 304b. The reactor R has an inlet port 302 for feeding reactive gases to the reactor and an outlet port 307 for the removal of un-reacted gases and products. The top pillow panel bundle is configured with manifolds 308a and 308b and ports 309a and 311a for addition and removal of heat transfer fluid. The heat transfer fluid can flow countercurrent or co-current. The lower bundle is similarly equipped with heat transfer fluid manifolds 308b and 310b and nozzles 309b and 311b. Elements 305, 306 and 307 have the same functions as described in FIGS. 2 and 3.

FIG. 4(b) is a top view cross section of the vertical reactor R. The pillow panel sections 315 are each the same length but each is a different width to fit the reactor. Optionally the bundle could be a square configuration with each panel the same width and a top plate to force the gas flow thru the catalyst zone. Heat transfer manifold 308a on top of the bundle is shown without showing its nozzle.

Figure 5:
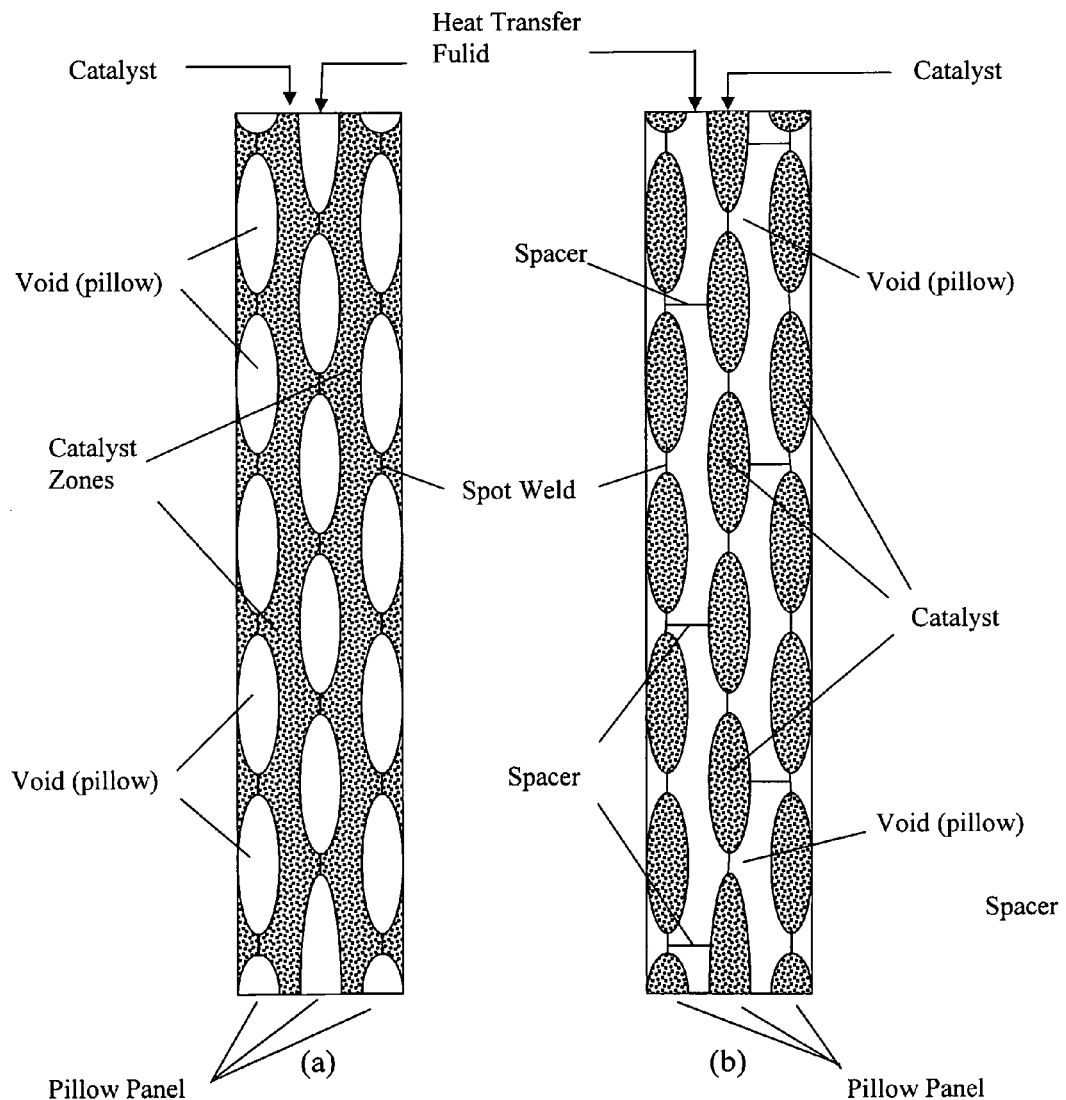
FIG. 5 is an illustration of a side view of a portion of a pillow panel bundles showing catalyst in two different locations.

FIG. 5 hereof side cut-away views of two different three pillow panel sections of a bundle. FIG. 5(a) shows the scenario where catalyst is located between pillow panels. Each section between panels can be a separate catalyst zone and each catalyst zone may independently contain the same or different catalyst, preferably the same catalyst. A feed gas to be reacted will be passed through at least a portion of the catalyst zones. The catalyst bed can be defined, for purposes of this invention as the sum of all catalyst zones containing the same catalyst. A heat exchange fluid will be passed through the panels, or voids, to remove heat or to supply heat depending on the reaction. In the case of Fischer-Tropsch heat will be removed.

FIG. 5(b) shows the scenario where the catalyst is not located within the panels and a heat transfer fluid is passed between the pillow panels. Manifold will be used to introduce both feed gas and heat transfer fluid into the predetermined locations. It will be understood that FIG. 5 hereof, as well as the other Figures hereof, are merely rough representations of the various features of a pillow panel reactor and are not drawn to scale. For example, the spot welds on an actual panel would not cover as much surface area as represented in FIG. 5 and bulges would be longer with respect to the spot welds.

The following is preferred where the heat of reaction greater than −50 KJ/Mol and for endothermic reactions with a heat of reaction greater than 50 KJ/Mol. While the pillow panel reactor of the present invention can be used for a variety of chemical and petroleum refinery processes. One preferred embodiment is that it be used for a Fischer-Tropsch process. The production of higher hydrocarbon materials from synthesis gas i.e. carbon monoxide and hydrogen, commonly known as the Fischer-Tropsch process has been in commercial use for many years. Such processes rely on specialized catalysts. The original catalysts for the Fischer-Tropsch synthesis were nickel. Nickel is still the preferred catalyst for hydrogenation of fats and specialty chemicals. Over the years, other metals, particularly iron and cobalt, have become preferred in the Fischer-Tropsch synthesis of higher hydrocarbons whereas copper has been the catalyst of choice for alcohol synthesis. Cobalt is particularly preferred for Fischer-Tropsch synthesis due to its high productivity and comparatively low deactivation rate. As the technology of these syntheses developed over the years, the catalysts have become more refined and have been augmented by promoters in the form of metals or metal oxides that function to promote their catalytic activity. These promoters include but are not limited to, Re, Ru, Os, Ir, Mo, W, Cu, Si, Cr, Ti, Mg, Mn, Zr, Hf, Ce, Al, Th and the like. In addition to cobalt, a ruthenium based catalyst can also utilized.

The catalytic metal and/or promoters may be added to a support which is typically a zeolite, or an inorganic oxide such as alumina, silica, silica/alumina, titania or mixtures thereof. The metals may be added by any method known in the art. Preferably catalytic metals are added to the support in one or more steps by an aqueous impregnation followed by drying and calcination. The metal impregnation may require multiple steps to achieve the desired loading of 10-60% for Cobalt and 0.01-2% for promoters.

The Fischer-Tropsch catalyst may be formed by any method known in the art such as spray drying, extrusion, pelletizing, pan agglomerization, etc. The preferred particle size of the present invention is about 100 to about 1,000 µm; the more preferred size is about 200 to about 500 µm.

The Fischer-Tropsch catalyst may be useful in synthesis processes for the formation of higher hydrocarbons wherein liquid and gaseous products are formed by contacting syngas comprising a mixture of hydrogen and carbon monoxide. The process is carried out at temperatures of from about 160° C. to 260° C., pressures of from about 1 atm to about 100 atm, preferably from about 10 to 40 atm, and gas hourly space velocities from about 300 V/Hr/V to about 20,000 V/Hr/V, preferably from about 1,000 V/Hr/V to about 15,000 V/Hr/V. The stoichiometric ratio of hydrogen to carbon monoxide is about 2.1:1 for the production of higher hydrocarbons. This ratio can vary from about 1:1 to 4:1, preferably from 1.5:1 to 2.5:1, more preferably from 1.8:1 to 2.2:1. These reaction conditions are well known in the industry and a particular set of reaction conditions can readily be determined from the parameters given herein.

In some cases, conventional fixed bed reactors can still be used for reaction that have a high absolute heat of reaction, like the Fischer-Tropsch reaction using relatively large diameter tubes (eg 2" or higher). The approach in these cases is to use catalysts with a relatively low activity, or operate at conditions that kinetically result in a low conversion per reactor unit volume. That is, at conditions of low reactor volumetric heat release, preferably without exceeding a generated heat of reaction greater than about −5 KJ/cc of catalyst bed/hour.

The present invention makes it possible to utilize high productivity catalyst that results in a high volume heat release.

This invention is better understood with reference to the following examples that are illustrative only and should not be taken as limiting the invention in any way.

EXAMPLE 1

A 1 mm tri-lobe extrudate was prepared using 62.97 grams of Pural 100 alumina, 0.04 g 1:100 $HNO_3$: distilled water solution, and 46 grams distilled water. The paste was worked for 10 minutes. The paste was then extruded with a laboratory extruder using a 1 mm tri-lobe die. The extrudate was dried for 12 hours at 120° C. and then ramped to 750° C. and calcined for 4 hours. 10 grams of the above extrudate was used to prepare a 20% Cobalt and 0.1% Ruthenium catalyst. A 15% Cobalt Nitrate solution was used to impregnate the support in 2 passes with 2 hours drying at 120° C. and 2 hours ramp to 300° C. with a 2 hour hold between passes. Ruthenium was added in the $2^{nd}$ pass only prior to drying and calcination. An additional 10% Cobalt was added with 2 more passes of Cobalt Nitrate solution, each followed by the same calcination procedure described above. The resulting catalyst has 30% Cobalt and 0.1% Ruthenium. The catalyst is referred to as catalyst 1 in the table 1 below.

EXAMPLE 2

A 1 mm tri-lobe extrudate was prepared as in example 1. This extrudate was crushed and sieved to a particle size of 250-425µ. A 13.2 g sample of the crushed and sieved support was used to prepare a 30% Cobalt and 0.1% Ruthenium catalyst. A 15% Cobalt Nitrate solution was used to impregnate the support in 4 passes with a 2 hour drying step at 120° C. and a 2 hour ramp to 300° C. followed by a 2 hour hold for each pass. The Ruthenium was added in the $4^{th}$ pass only prior to drying and calcination. This catalyst is identified as catalyst 2 in table 1 below.

TABLE 1

Catalytic performance of catalysts 1 and 2.

| | Conversion | C1 selectivity | C5+ | Productivity | $H_2$/CO feed | GHSV |
|---|---|---|---|---|---|---|
| Catalyst 1 | 64.1 | 15.1 | 76.6 | 412 | 1.8 | 2750 |
| Catalyst 2 | 64.9 | 6.2 | 87.2 | 749 | 1.8 | 4750 |

*All data at 400° F., 400 psig

EXAMPLE 3

A 110 cc sample of catalyst support crushed and sieved to 250-425 u was loaded into a 0.5 inch i.d. tubular reactor for pressure drop measurement. The catalyst zone was 3 ft in length. A representative syngas with a 2/1$H_2$:CO ratio was passed over the catalyst support at various flow rates and pressure drop measurements were taken and are recorded in table 2 below. An Ergon equation was used to calculate some of the pressure drops for comparison and to calculate pressure drop at higher velocity than was measured. The highest flow (1800 sccm) for the calculated pressure drop is 0.52 ft/s.

TABLE 2

| Flow (sccm) | Press drop-PSI (measured) | Press drop-PSI (calculated) |
|---|---|---|
| 1865 | 2.9 | |
| 2909 | 4.6 | |
| 3883 | 6.4 | 6.4 |
| 4880 | 8.0 | |
| 5900 | 9.4 | 11.8 |
| 6918 | 9.9 | |
| 14500 | | 22.2 |
| 18000 | | 28.9 |

EXAMPLE 4

A conventional fixed bed tubular reactor is designed to conduct a Fischer-Tropsch reaction and produce about 1,000 BPD of products based on the total carbon content in the CO fraction of the feed. The reactor is designed with 1 inch tubes 40 ft long and limited to an average productivity of 250 due to heat transfer limits. The reactor feed is 30MMSCFD of syngas containing 59.5% $H_2$, 29% CO and 11.5% inerts. The gas is fed to the reactor with a 0.6 recycle ratio therefore the total feed is 1.6 times the fresh feed or 48MMSCFD. The reactor contains 6188 tubes with a total catalyst volume of 1,350 $ft^3$. The reactor operates at an inlet pressure of 350 psig and a velocity of 1.1 ft/s requiring a catalyst particle size greater than 1 mm in diameter to operate with a pressure drop of less than 100 psig. The large catalyst particle operates in a diffusion restricted manner and therefore produces high methane selectivity with reduced yields of desirable C5+ products of 891 BPD, a 119 BPD reduction to the design target. Also, about 1.5 ft$^3$ of catalyst bed volume is necessary for the production of 1 BPD of C5+ products.

EXAMPLE 5

A fixed bed pillow panel reactor is designed to conduct a Fischer-Tropsch reaction under the same conditions and with the same feed gas as example 4. The pillow panel bundle contains 115 pillow panels 5 ft by 20 ft set at ¾ inch spacing center to center and installed in a horizontal shell as in FIG. 2. The average space between panel faces is 0.474 inches. Therefore, each catalyst zone is 3.95 ft3 for a total catalyst volume of 450 ft3. The pillow panel reactor operates at a Gas Hourly Space Velocity three times that of the tubular reactor of example 3 since the catalyst volume is one third as much. However, the actual velocity in the catalyst bed (0.52 ft/s) is less than half the velocity in the fixed bed tubular reactor since the cross sectional area of the pillow panel reactor is 90 ft3, compared to the tubular reactor which is only 33.75 ft3. Also, the bed depth is only 5 ft compared to 40 ft for the tubular reactor. The net effect is that the pillow panel reactor can operated efficiently with an optimum catalyst particle size such as the catalyst of example 2 with a pressure drop approximately equivalent to the last calculated value in table 2. This particle size of catalyst can not be used in the tubular fixed bed reactor because of excessive pressure drop. The pillow panel reactor is maintained at a 1/1 recycle ratio with 65% conversion per pass and 94% overall conversion. The reaction yields 1,005 BPD of C5+ products. In this case, only about 0.43 ft$^3$ of catalyst bed volume is necessary for the production of 1 BPD of C5+ products. The reactor volumetric productivity is therefore about 3.5 higher than that for the tubular reactor.

The benefits of the pillow panel reactor have been highlighted in the attached examples. One skilled in the art can find numerous variations.

What is claimed is:

1. A process for conducting a chemical reaction comprising the steps of:
    introducing a feed gas into at least one catalyst zone of a chemical reactor;
    operating said chemical reactor under predetermined process conditions of temperature, pressure, and treat gas, which said chemical reactor is characterized as:
    (a) a vessel having enclosing walls defining an inner chamber, which vessel contains at least one inlet port and at least one outlet port for introducing reactant feed gas and removing reactant products from the vessel;
    (b) at least one pillow bundle positioned inside of said chamber, which bundle is comprised of a plurality of pillow panels, wherein each pillow panel is characterized as having two superimposed sheet metal plates permanently connected to each other at respective spaced apart connecting points distributed in an array on a surface of the plates, at least one of the two plates between the respective connection points, bulging outward to form a bulge having a pillow-like configuration, separation between the two plates in every radial direction from each connecting point continuously increasing with distance from each connecting point toward a neighboring connecting point, to a maximum separation about midway between pairs of neighboring connecting points, thereby forming a continuous void volume throughout the interior of the pillow panel between connecting points;
    (c) at least one input port and at least one outlet port for each said pillow panel being an integral part of said bundle, said inlet and outlet ports manifolded together to circulate heat transfer fluid; and
    (d) porous support material to support at least one particulate catalyst located between said pillow panels of said bundle so that said reactant gases must pass through said catalyst zone.

2. The process of claim 1 wherein the chemical reaction having an absolute heat of reaction greater than about 50 KJ/g mol.

3. The process of claim 1 wherein the chemical reaction having an absolute heat of reaction generated inside of the reaction zones greater than about 5 KJ/cc of catalyst bed/hour.

4. The process of claim 1 wherein the chemical reaction is selected from the group consisting of Fischer-Tropsch, methanol production from syngas, ammonia synthesis, steam reforming, dehydration of oxygen-containing hydrocarbons, and hydrotreating.

5. The process of claim 4 wherein the chemical reaction is said Fischer-Tropsch.

6. The process of claim 1 wherein the bulge height is from about 0.05 to about 1 inch.

7. The process of claim 1 wherein the separation between panels is from about 0.05 to about 1 inch.

8. A process for conducting a chemical reaction comprising the steps of:
    introducing a reactant feed gas into at least one catalyst zone of a chemical reactor;
    operating said reactor under predetermined process conditions of temperature, pressure, and treat gas, which said chemical reactor is characterized as:
    (a) a vessel having enclosing walls defining an inner chamber, which vessel contains at least one inlet port and at least one outlet port for introducing reactant feed gas and removing reactant products from the vessel;
    (b) at least one pillow bundle positioned inside of said chamber, which bundle is comprised of a plurality of pillow panels, wherein each pillow panel is characterized as having two superimposed sheet metal plates permanently connected to each other at respective spaced apart connecting points distributed in an array on a surface of the plates, at least one of the two plates between the respective connection points, bulging outward to form a bulge having a pillow-like configuration, forming a continuous void volume throughout the interior of the pillow panel between connecting points;
    (c) at least one input port and at least one outlet port for each said pillow panel being an integral part of said bundle, said inlet and outlet ports manifolded together to circulate heat transfer fluid; and
    (d) porous support material to support a particulate catalyst between said pillow panels so that said reactant gases must pass through said catalyst zone.

9. The process of claim 8 wherein the chemical reaction is an endothermic reaction having an absolute heat of reaction greater than about 50 Kj/g mol.

10. The process of claim 8 wherein the chemical reaction is an exothermic reaction having an absolute heat of reaction generated inside of the reaction zones greater than about 5 KJ/cc of catalyst bed/hour.

11. The process of claim 8 wherein the bulge height is from about 0.05 to about 1 inch.

12. The process of claim 8 wherein the chemical reaction is selected from the group consisting of Fischer-Tropsch, methanol production from syngas, ammonia synthesis, steam reforming, dehydration of oxygen-containing hydrocarbons, and hydrotreating.

13. The process of claim 8 wherein the chemical reaction is said Fischer-Tropsch.

14. The process of claim 8 wherein the separation between panels is from about 0.05 to about 1 inch.

15. A method of conducting an exothermic chemical reaction which comprises the steps of:
   introducing a reactant stream through an inlet port to an enclosed vessel;
      wherein said enclosed vessel comprising at least one pillow panel bundle positioned within said enclosed vessel wherein said at least one pillow panel bundle includes a plurality of pillow panels to create a continuous void volume through said panel as an internal passage for circulation of cooling fluid;
      wherein said enclosed vessel comprising a supported catalyst within and wherein said supported catalyst defines a catalyst zone between adjacent pillow panels of said plurality of pillow panels of said pillow panel bundle;
   circulating said cooling fluid through said internal passage;
   passing the reactant stream through the catalyst zone between said adjacent pillow panels; and
   removing partially reacted components and reaction products from an outlet port of said vessel.

* * * * *